(12) United States Patent
Wiedemann et al.

(10) Patent No.: US 7,392,632 B2
(45) Date of Patent: Jul. 1, 2008

(54) BEVERAGE BOTTLING PLANT WITH BEVERAGE BOTTLE HANDLING MACHINES HAVING BEVERAGE BOTTLE TRANSFER STATIONS AND A METHOD OF OPERATION THEREOF

(75) Inventors: Ulrich Wiedemann, Dortmund (DE); Klaus Jendrichowski, Holzwickede (DE)

(73) Assignee: KHS Maschinen-und Anlagenbau AG, Dortmund (DE)

( * ) Notice: Subject to any disclaimer, the term of this patent is extended or adjusted under 35 U.S.C. 154(b) by 0 days.

(21) Appl. No.: 11/531,002

(22) Filed: Sep. 12, 2006

(65) Prior Publication Data
US 2007/0079574 A1 Apr. 12, 2007

(30) Foreign Application Priority Data
Sep. 13, 2005 (DE) ........................ 10 2005 043 437

(51) Int. Cl.
*B65B 35/30* (2006.01)
*B65G 47/24* (2006.01)

(52) U.S. Cl. ........................... 53/147; 53/543; 198/408; 198/445

(58) Field of Classification Search .................. 53/446, 53/448, 537, 539, 544, 167; 198/407, 408, 198/416, 445, 456

See application file for complete search history.

(56) References Cited

U.S. PATENT DOCUMENTS

| 183,433 | A | | 10/1876 | Stoddard et al. | |
|---|---|---|---|---|---|
| 3,625,336 | A | * | 12/1971 | Fuwa et al. | 198/456 |
| 3,643,780 | A | * | 2/1972 | Shimogaki et al. | 198/408 |
| 3,710,918 | A | * | 1/1973 | Babunovic | 198/445 |
| 4,199,049 | A | * | 4/1980 | Vamvakas | 198/408 |
| 4,375,374 | A | * | 3/1983 | Kronseder et al. | 198/445 |
| 5,135,014 | A | * | 8/1992 | Beswick | 198/713 |
| 5,310,300 | A | * | 5/1994 | Crabb et al. | 53/537 |
| 6,415,903 | B1 | * | 7/2002 | Zinno et al. | 198/408 |
| 7,055,670 | B2 | * | 6/2006 | Florczak et al. | 198/408 |

FOREIGN PATENT DOCUMENTS

DE 1105298 4/1961
DE 4010646 A1 10/1991

* cited by examiner

*Primary Examiner*—Louis Huynh
(74) *Attorney, Agent, or Firm*—Nils H. Ljungman & Associates

(57) ABSTRACT

A transfer station in a container filling plant comprising an input, an output, a conveyor for feeding containers, a plurality of spaced apart webs disposed upstream of the input of the transfer station, and vertically oriented rotatable directing elements, each rotatable about its vertical rotational axis and disposed upstream of the webs for contacting the bodies of the containers to steer the containers into the receiving spaces between the webs.

17 Claims, 11 Drawing Sheets

BEVERAGE BOTTLING PLANT WITH BEVERAGE BOTTLE HANDLING MACHINES HAVING BEVERAGE BOTTLE TRANSFER STATIONS AND A METHOD OF OPERATION THEREOF

BACKGROUND

1. Technical Field

This application relates to a beverage bottling plant with beverage bottle handling machines having beverage bottle transfer stations and a method of operation thereof. This application further relates to a transfer station on container handling machines/bottle cleaning machines and similar machines with a wide infeed area comprising a plurality of transport paths located next to one another for feeding the containers into the receptacle devices of the handling machine and a conveyor that runs at a right angle or at an angle to the actual transfer direction and for the feed and removal of the containers to be handled, with a transition area to the transport paths of the infeed or discharge area and intermediate webs that separate these transport paths and to a method for the feeding of such containers.

2. Background Information

Transfer stations of this type are preferably used on container handling machines such as cleaning and/or sterilization machines, bottle cleaning machines and similar machines. On bottle cleaning machines in particular, the bottles to be cleaned are received in cells that are located next to one another and are guided through the individual handling, presoaking and spraying stations. For this purpose, it is necessary to insert the individual bottles, preferably lying down, into the cells, a large number of which are located next to one another.

To keep an appropriate and sufficient number of bottles constantly available in the vicinity of the transfer station, a transfer station of this type has a plurality of feed rows that are located next to one another and the number of which corresponds to the number of cells, in which feed rows, viewed in the direction of the infeed, a plurality of bottles are accumulated one behind the other. The forward row of bottles closest to the cell openings is then gripped from underneath in the base area by transfer mechanisms that are equipped with a plurality of transfer cams and are transported along a bottle guide plane that lies between the intermediate webs of such an infeed table area to the bottle cells that are being guided past it. In the cleaning machine itself, these bottle cells can be guided continuously or discontinuously to the individual handling stations, and after the completion of the handing operation, they can exit the machine in the reverse sequence and the bottles or containers can be discharged. High-capacity machines preferably operate continuously and require a correspondingly large feed of bottles. For this purpose, conveyors which for their part have a plurality of plate belts or conveyors and run next to one another are oriented at a right angle or at an angle in front of the overall transfer station.

A critical factor for the smooth transfer of the bottles is in this case the immediate transfer area between the infeed conveyors that run at right angles and the cassette-like feed tracks that run perpendicular to them. In this area, there is frequently a stationary transition plate that connects the two transport planes with each other and during the infeed and transfer process guides the bottles with the known disruptions of the smooth movement. But even with conveyors that are routed directly to the transfer or line-up position, e.g. curved conveyors, areas where the bottles or containers back up and jostle one another occur immediately upstream of the end-side areas of the intermediate webs that determine the final distances between the rows which lead to disruptions in bottles as they join the flow or fallen bottles, with the resulting noise these phenomena generate.

On such transfer stations, therefore, the prior art has suggested a movable transition plate that runs between the conveyors and is mounted so that it can be moved back and forth relative to the bottles that are standing on it transverse to the intended direction of transfer, and with a directing element in the form of a blade that comes into contact with the bottles (DE 40 10 646 A1). In this case, all of the elements that work together execute rigid, cross-shaped movements with respect to one another, which naturally under elevated noise conditions cause a displacement of the bottles as they bump into one another with an increased jostling effect, but prevent the controlled feed of the bottles into the feed path.

OBJECT OR OBJECTS

Taking into consideration the realizations of the prior art, and to essentially eliminate or minimize the disadvantages described above, the object is to realize a transfer station of the type described above that reduces the zones in which the bottles are subject to jostling and simultaneously reduces the noise generated.

SUMMARY

According to at least one possible embodiment, upstream in the infeed direction of the end sides of the intermediate webs there are directing elements that are oriented perpendicular to and can be placed in contact against the cylindrical outer surface of the containers and steer or guide the containers.

At least one other possible embodiment describes a method for the infeed of containers into receiving cells of container cleaning machines with a transfer station as described herein, in which the containers can be brought from their locations located on feed paths formed by intermediate webs by means of at least one guide and steering element that is in contact against their external cylindrical surface into the entry position to guarantee a smooth insertion into the flow of bottles. Additional characteristics of other possible embodiments are disclosed herein.

According to at least one possible embodiment, the bottles are permitted to join the flow of bottles smoothly, with a simultaneous reduction of the otherwise unavoidable impact and noise pulses that are generated by the incoming bottles. In particular, the bottles are inserted into the feed paths with a smooth, steered or even rolling insertion movement.

At least one possible embodiment is explained in greater detail below on the basis of an exemplary embodiment on an infeed station of a bottle cleaning machine. At least one other possible embodiment can also be used in a correspondingly adapted realization on the bottle discharge of a bottle cleaning machine or on other bottle handling machines.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
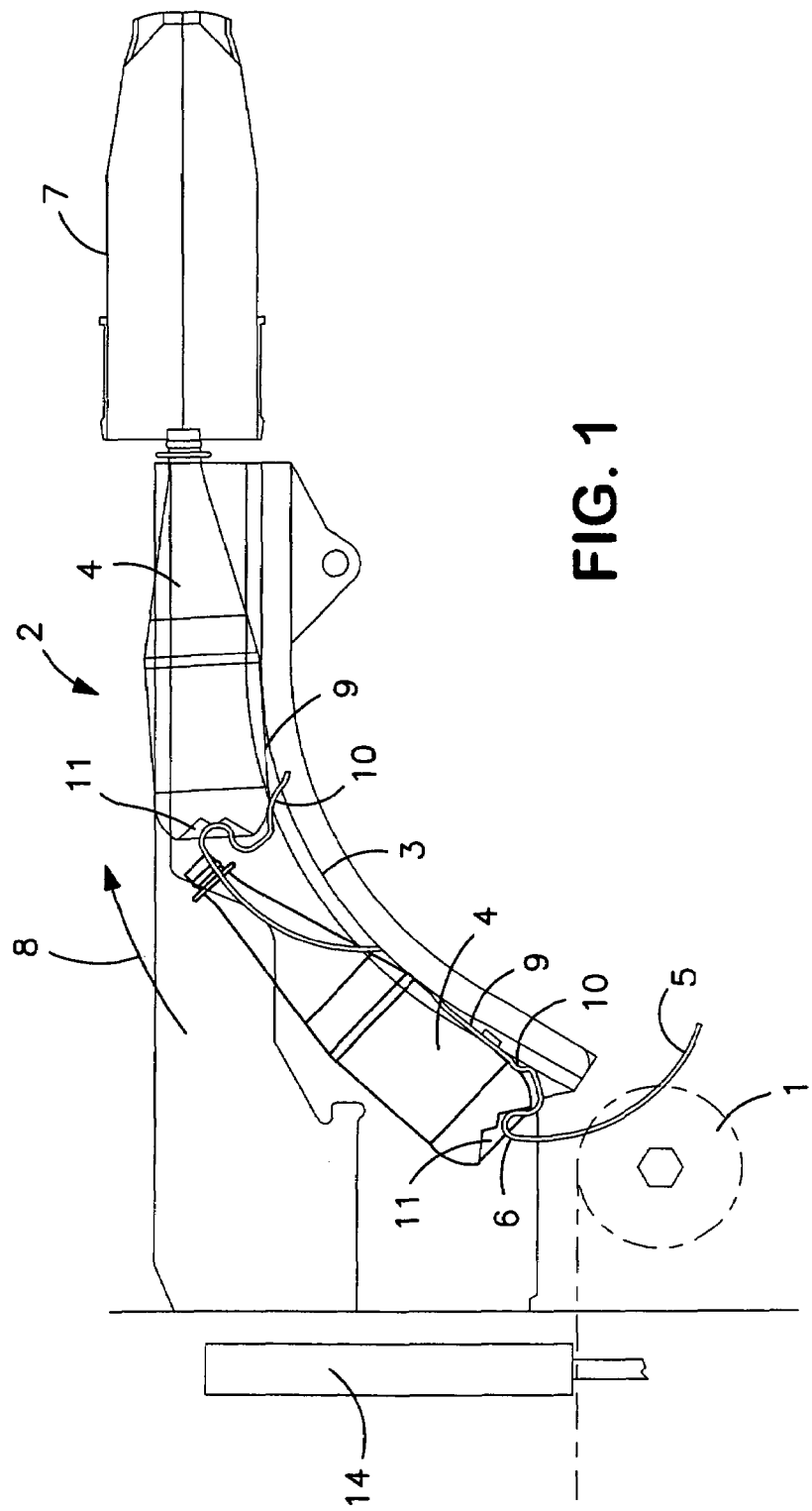
FIG. 1 shows a side view of a typical transfer station according to at least one possible embodiment.
Figure 1A:
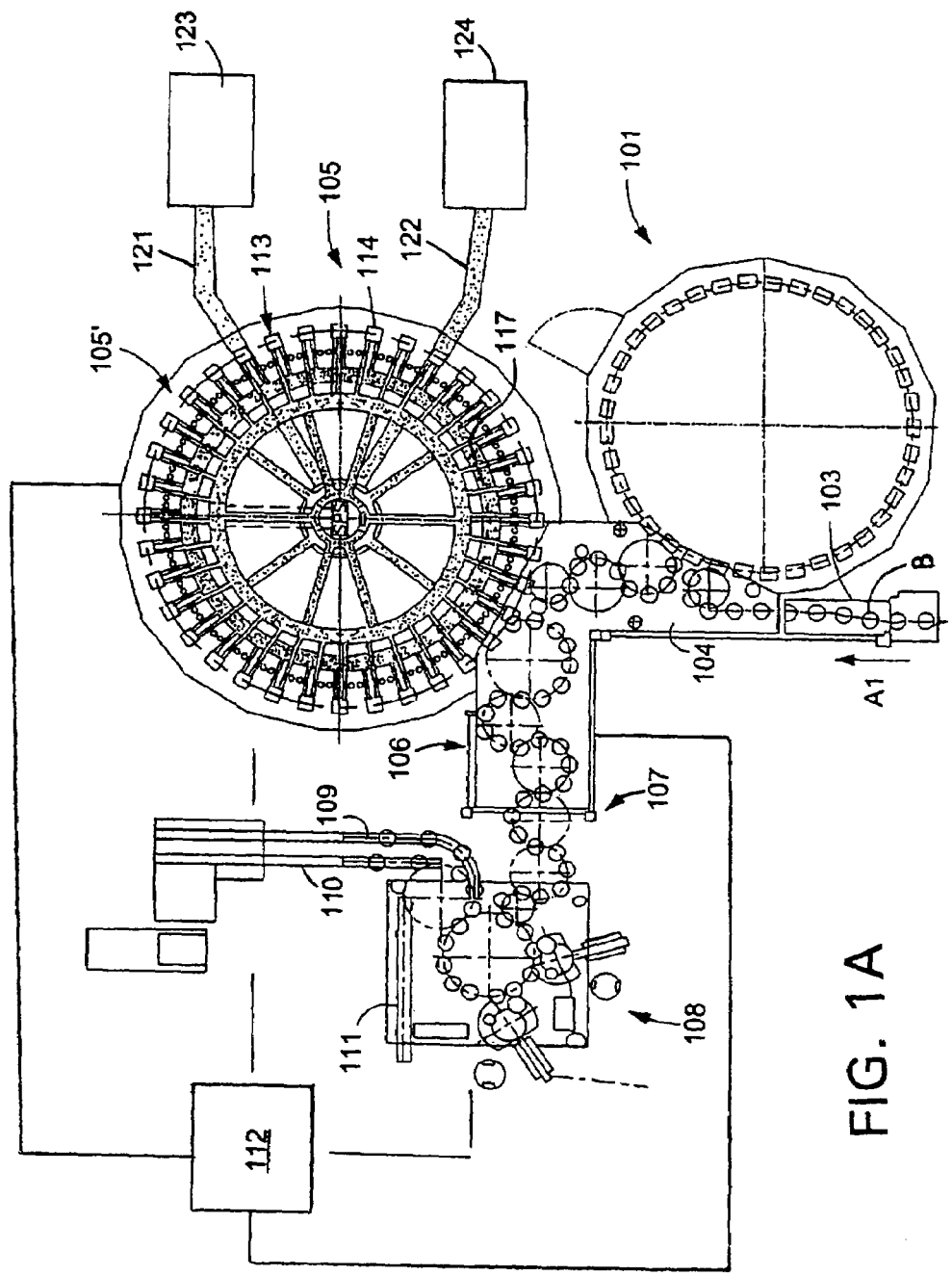
FIG. 1A shows schematically the main components of one possible embodiment example of a system for filling containers, such as bottles.

FIG. 1A shows schematically the main components of one possible embodiment example of a system for filling containers, specifically, a beverage bottling plant for filling bottles B with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles B, are fed in the direction of travel as indicated by the arrow A1, by a first conveyor arrangement 103, which can be a linear conveyor or a combination of a linear conveyor and a starwheel. Prior to entering the rinsing arrangement 101 for a final rinsing before filling, the bottles B, according to at least one possible embodiment, may be cleaned in a bottle cleaning station or bottle cleaning machine 125. Downstream of the rinsing arrangement or rinsing station 101, in the direction of travel as indicated by the arrow A1, the rinsed bottles B are transported to a beverage filling machine 105 by a second conveyor arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Downstream of the beverage filling machine 105, in the direction of travel of the bottles B, there can be a beverage bottle closing arrangement or closing station 106 which closes or caps the bottles B. The beverage bottle closing arrangement or closing station 106 can be connected by a third conveyor arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 is connected by a starwheel conveyor structure to three output conveyor arrangements: a first output conveyor arrangement 109, a second output conveyor arrangement 110, and a third output conveyor arrangement 111, all of which convey filled, closed, and labeled bottles B to different locations.

The first output conveyor arrangement 109, in the embodiment shown, is designed to convey bottles B that are filled with a first type of liquid beverage supplied by, for example, the supply reservoir 123. The second output conveyor arrangement 110, in the embodiment shown, is designed to convey bottles B that are filled with a second type of liquid beverage supplied by, for example, the supply reservoir 124. The third output conveyor arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyor arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Figure 1B:
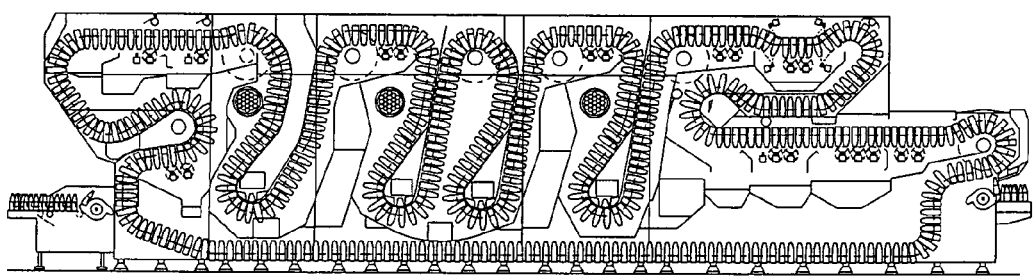
FIG. 1B shows a side view of a bottle washing machine.

FIG. 1B shows a bottle washing or bottle cleaning machine and components thereof which may possibly be utilized in at least one possible embodiment. In the embodiment shown, bottles are fed into the cleaning machine into bottle holding structures. The bottles are then conveyed through cleaning areas within the machine before exiting out of the machine. The bottle holding structures are continuously cycled through the machine to permit a substantially uninterrupted operation of the machine and thus an essentially constant throughput of a substantial number of bottles to meet the needs of high-speed bottling plants. High-speed bottling plants, such as the one shown in FIG. 1A, can, in some instances, process as many as 150,000 bottles per hour, so it is necessary to utilize a cleaning machine that can handle a huge number of bottles quickly. Examples of such machines are the Innoclean line of bottle washing machines, manufactured by KHS Maschinen-und Anlagenbau AG, located at Juchostrasse 20, D-44143 Dortmund, Germany. The Innoclean brochure published by KHS Maschinen-und Anlagenbau AG is hereby incorporated by reference herein.

Figure 1C:
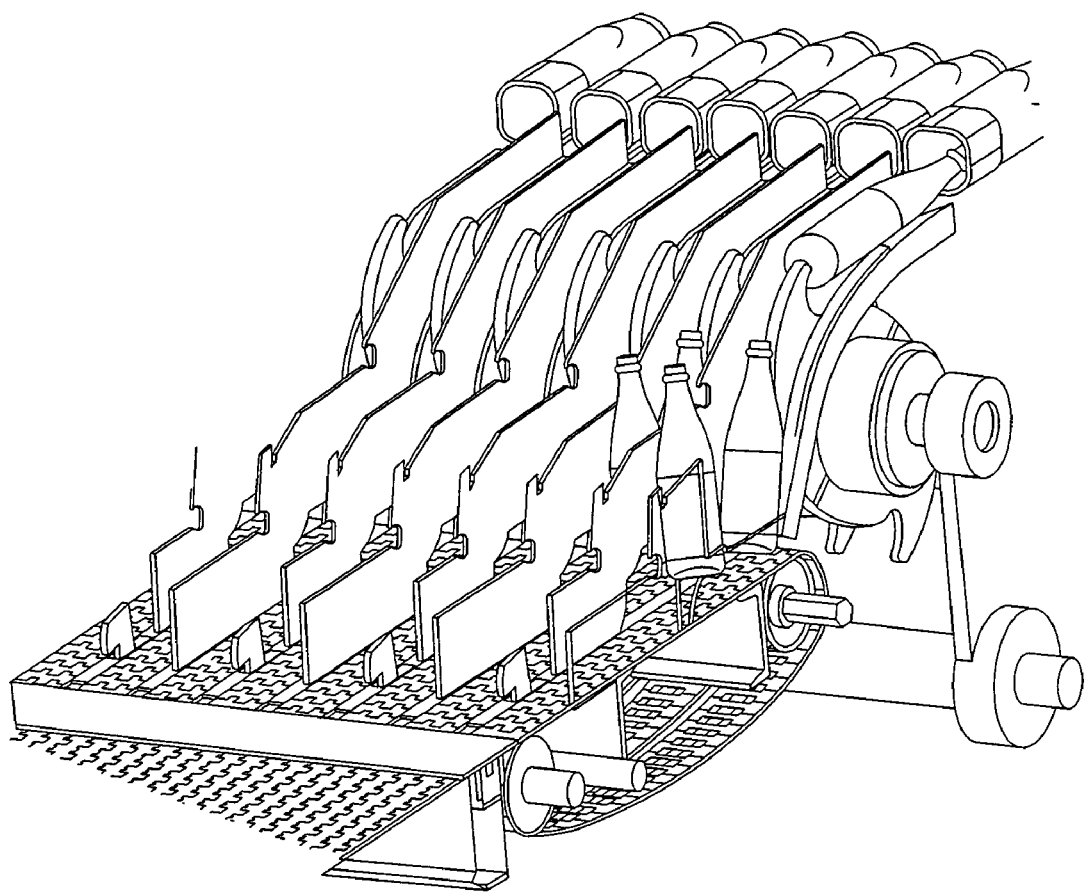
FIG. 1C shows a perspective view of an infeed arrangement for use in a bottle washing machine, such as shown in FIG. 1B.
Figure 1D:
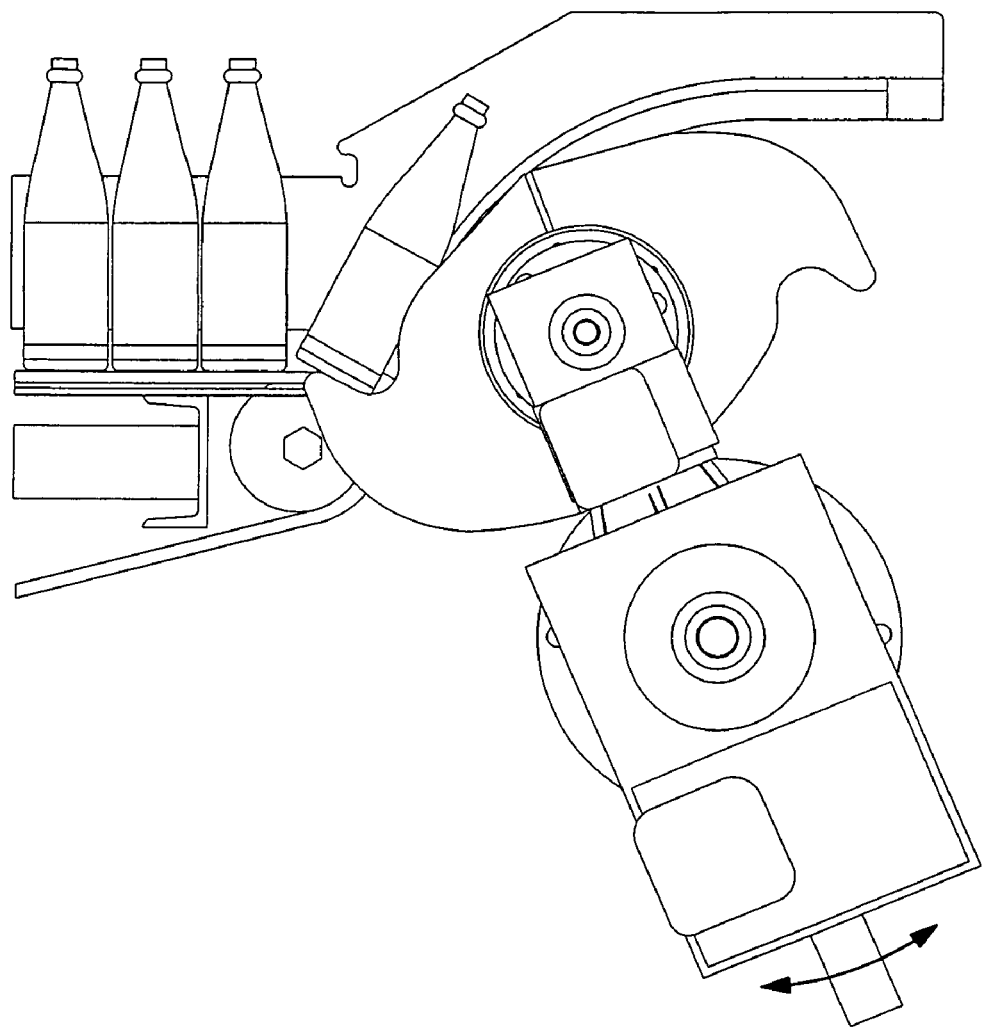
FIG. 1D shows a side view of a rotating feed mechanism for use in an infeed arrangement, such as shown in FIG. 1C.

FIG. 1C shows a perspective view of an infeed arrangement for use in a bottle washing machine, such as shown in FIG. 1B, and components thereof which may possibly be used in one possible embodiment. As shown in the drawing, bottles are fed in on a single conveyor belt and then separated into individual streams by guide structures on individual conveyor belts. The bottles are then tilted onto a curved guide structure, at which point a rotating feed mechanism rotates and contacts the bottoms of the bottles with projecting arm structures. As can be seen in the drawing, the arm structures lift the bottles and move them up the curved path so that the bottles are moved from a vertical standing position to a horizontal position in which the bottles are lying on their sides. The rotating feed mechanism continues to rotate and thus drive the bottles into bottle receptacles, such as those shown in FIG. 1B. Substantially simultaneously, the other ones of the two sets of projecting arm structures pick up another group of bottles to be placed in bottle receptacles. The bottle receptacles are moved in an upward direction so that upon one set or row being filled with bottles, another empty set or row of receptacles is moved into place to receive another group of bottles. FIG. 1D shows a side view of the rotating feed mechanism, such as shown in FIG. 1C.

In the exemplary embodiment illustrated in FIG. 1, the transfer station comprises a stationary infeed conveyor 1, which can comprise, for example, a plurality of plate conveyors that run next to each other and are located at a small distance from each other, and which is preferably located upstream of the infeed table itself with the infeed area 2 which has its own bottle guidance plane 3, which is preferably in contact laterally on the bottles 4, and between which a rotating transfer mechanism 5 with transfer cams 6 rotates. On the end of the bottle guide plane 3 farther from the feeder conveyor 1, the actual bottle cells 7 move continuously or discontinuously and receive the bottles 4 as they are delivered by the transfer device 5 or its transfer cams 6 for further processing in the bottle cleaning machine, which is not illustrated in any further detail in FIG. 1. The infeed table field can be mounted so that it is rigid or movable. On the transfer device 5, in the transfer direction 8, upstream of the transfer cams 6, there is a support surface 10 that grips the bottle surface 9 from below during the transfer movement. This support surface, depending on the sequence of movements, lies at different points on the bottle body and thereby makes it possible for the transfer cam 6 to grip bottles from below that have different base shapes 11.

Figure 2:
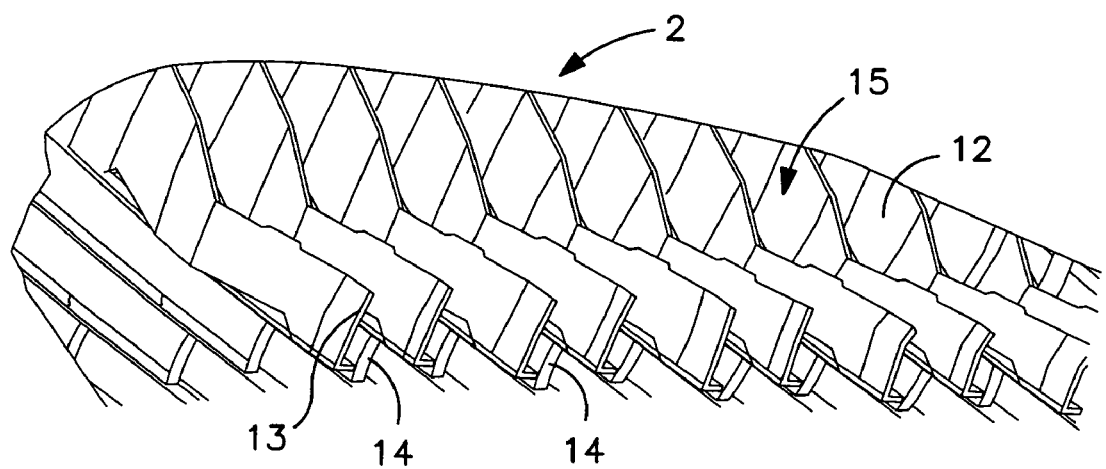
FIG. 2 shows the immediate area of a transfer station where the bottles being fed in join the stream of bottles.

As shown in FIG. 2, the bottle guide plane 3 has intermediate webs 12 that are located laterally with respect to the bottles 4 and that separate the individual transport paths, and which have, upstream of their end sides 13 in the direction of the infeed, vertically upright directing elements 14 that can be placed in contact with the bodies of the bottles or containers, so that during the forward movement each of the directing elements 14 steers the bottles with which it is in contact into the cassettes or feed paths 15 formed by the intermediate webs 12 or guides them into an appropriate position. These directing elements 14 are advantageously realized in the form of rotation elements that are oriented vertically upright and are located upstream of the end sides 13 of the intermediate webs and for optimal directional control are realized in the form of slender roll bodies, the cylindrical surface of which can also have a noise-reducing surface in the area of contact with the bottles or containers 4. The rotation elements 14 can also be realized in the form of rotationally mounted roll bodies that can be rotated in alternating directions of rotation depending on the lateral back-up pressure that occurs, whereby the outer surfaces of these roll bodies are preferably adapted to the outside contour of the bottles 4 that are joining the stream or run parallel to the cylindrical surfaces of the bottles. It has been found to be particularly advantageous if the rotation elements 14 can be driven in rotation or can also be driven in different controlled directions of rotation, whereby their rotational speed can be regulated individually as a function of the back-up pressure, the current throughput of the machine or also as a function of the bottle material and the size of the bottles to be handled. The necessary drive elements 16 are located underneath the container transport plane. A particularly simple and advantageous drive is a rack-and-pinion drive 17 that can be driven by a crank or a similar system, by means of which, optionally, different directions of rotation of the rotation elements 14 can be generated with an active back-and-forth movement of the rack, and thus particularly advantageous control of the direction or diversions of the bottles 4 being fed in can be achieved. Of course, other suitable drive mechanisms can be utilized to rotate the rotation elements 16 in accordance with at least one other possible embodiment.

In accordance with the method described in the claims, the containers or bottles 4 are moved into the proper infeed position and position in the bottle stream from their locations outside the cassettes or feed paths 15 that are formed by the intermediate webs 12 by means of guide or steering elements, directing elements or rotation elements 14 that are in contact with the bottles in at least an optimal position of the outer surface. The containers 4 are thereby preferably placed in rotation so that they can be inserted into the feed path 15 and are introduced into the feed path 15 while rotating around their vertical axis or rolling past the rotation elements. In this case, a forced guidance of the bottles/containers 4 can be provided immediately upstream of the intermediate webs 12.

Figure 3:
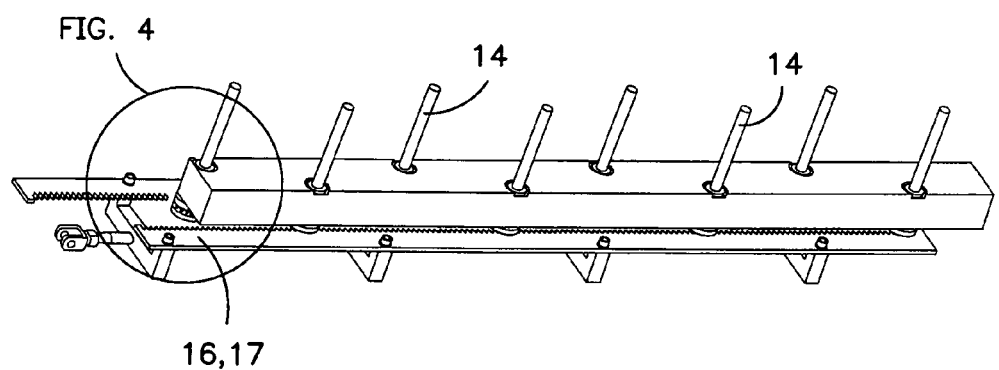
FIG. 3 shows an arrangement of directional devices in the form of rotation elements.
Figure 4:
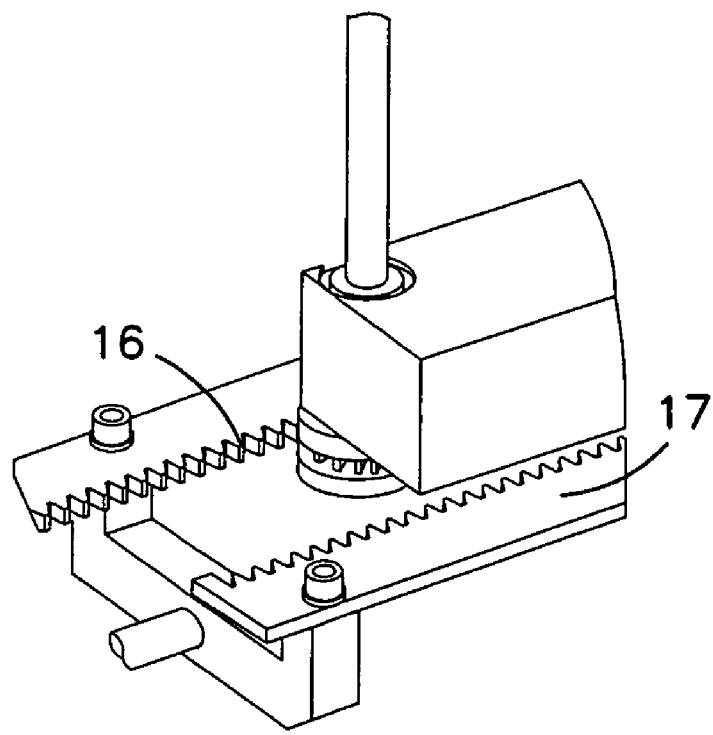
FIG. 4 is an enlarged detail from FIG. 3.
Figure 5:
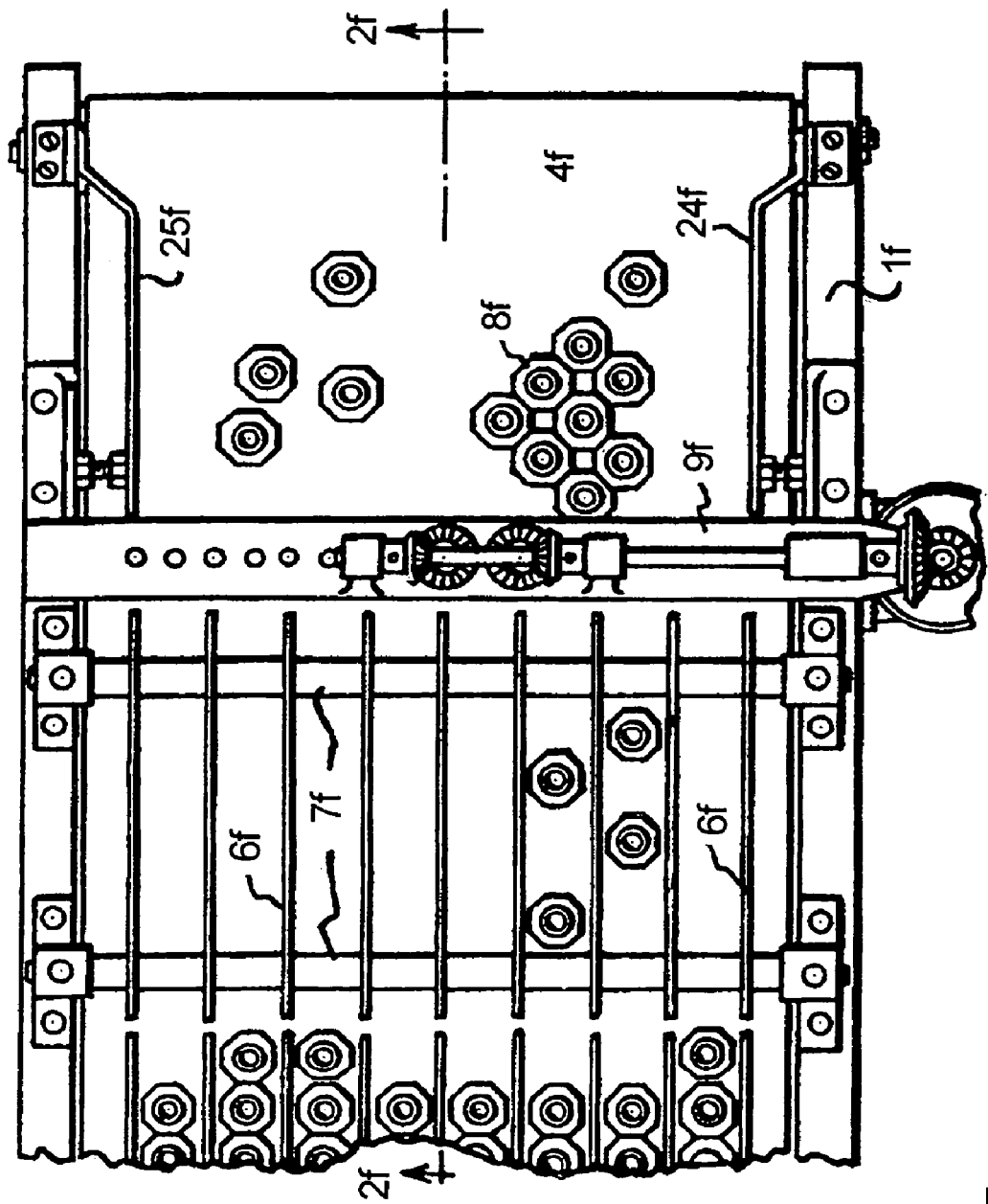
FIG. 5 is a plan view of a portion of a container washer according to U.S. Pat. No. 2,183,433.
Figure 6:
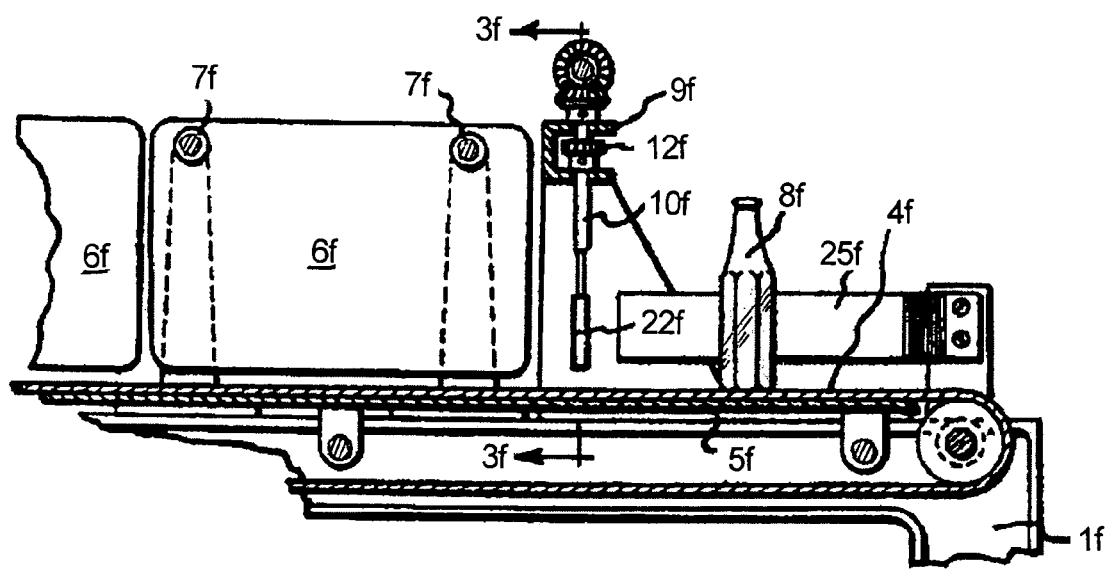
FIG. 6 is a sectional view taken along the lines 2-2 of FIG. 5.
Figure 7:
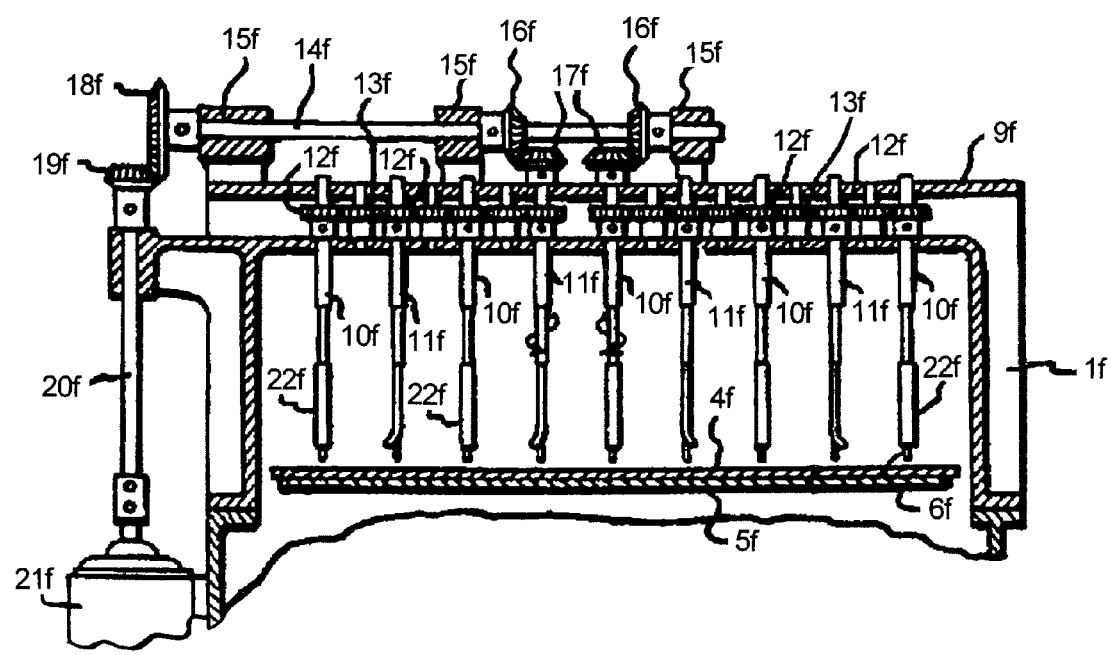
FIG. 7 is a sectional view taken along the lines 3-3 of FIG. 6.

FIGS. 5-7 are essentially copies of FIGS. 1-3 in U.S. Pat. No. 2,183,433, issued on Dec. 12, 1939 to Rheinstrom, the only difference being the addition of the letter "f" to each reference numeral to distinguish those reference numerals from the reference numerals in the other figures. U.S. Pat. No. 2,183,433 is hereby incorporated by reference. The following description of FIGS. 5-7 has also been obtained from U.S. Pat. No. 2,183,433.

In the FIGS. 5-7, 1f designates the frame of the machine, and 4f the conveyor, which, as shown, is of the belt type moving on suitable sheaves and supported in its upper run by a supporting means 5f. Reference numeral 6f indicates the vanes held above the conveyor by suitable supporting means. The containers or articles to be arranged are indicated at 8f.

Across the machines, above the conveyor 4f, is erected a suitable, bridge or supporting means 9f, high enough to clear the tops of the various containers 8f which are to be handled on the machine. As shown in this embodiment, the bridge 9f is of U-shaped cross section and a plurality of vertical shafts 10f and 11f are journaled in both arms of the U. These shafts will be described more in detail hereinafter. Arrangement is made to drive the several shafts preferably although not necessarily, in two series, each moving toward the center line of the conveyor, as respects the approaching containers, from the nearest side of the conveyor. To this end, in the embodiment shown, pinions 12f are attached to the vertical shafts and lie within the U of the bridge. Intermediate pinions 13f are also journaled in the U and mesh with the pinions 12f so as to connect the shafts together at least in groups.

A longitudinal shaft 14f is journaled in bearing brackets 15f on the bridge and connected by means of beveled gears 16f to beveled gears 17f fixed upon one shaft at least of each group. The shaft 14f is in turn connected by beveled gears 18f and 19f to a vertical shaft 20f which is coupled to a motor 21f, or alternatively to the main drive of the machine.

In operation, the vertical shafts can revolve at a relatively low speed, say, four times per second; but the speed may be widely varied. The containers 8f are placed haphazardly upon the conveyor 4f, and approach the vanes 6f. They are usually confined between side guide members 24f and 25f in substantial alignment with the outer vanes. The rotating shafts at the ends of the vanes push the containers to one side, if the containers do not approach the vanes in alignment with the spaces therebetween. Thus locking and jamming is prevented. The bent ends of the shaft 11f where they are used, jog the containers, actually pushing them backwardly a slight distance on the conveyor 4f and releasing jams which occur ahead of the vanes. The displacement pressure of the shafts 11f is exerted on the containers near their bases, so that there is no tendency to upset the containers on the conveyor. The shafts 10f, of course, contact the containers throughout the greater part of the length of their body portions.

One feature or aspect of an embodiment is believed at the time of the filing of this patent application to possibly reside broadly in a transfer station on container handling machines and similar machines with a wide infeed field consisting of a plurality of transport paths that are located next to one another for feeding containers into the receiving devices of the handling machine and a conveyor that runs at a right angle or at an angle to the actual transfer direction and is used for the feed and discharge of the containers to be handled, with a transition area to the transport paths of the infeed or discharge area and intermediate webs that separate these transport paths, characterized in that upstream in the infeed direction of the end surfaces 13 of the intermediate webs 12, there are vertically oriented directing elements 14 that can be placed in contact with the bodies of the containers to steer or guide the containers.

Another feature or aspect of an embodiment is believed at the time of the filing of this patent application to possibly reside broadly in a transfer station on container handling machines and similar machines with an infeed field consisting of a plurality of transport paths that are located next to one another for feeding containers into the receiving devices of the handling machine and a conveyor that runs at a right angle or at an angle to the actual transfer direction and is used for the feed and discharge of the containers to be handled, with a transition area to the transport paths of the infeed or discharge area and intermediate webs that separate these transport paths, characterized in that the directing elements are realized in the form of rotation elements that are oriented vertically upstream in the feed direction of the end surfaces 13 of the intermediate webs 12.

Yet another feature or aspect of an embodiment is believed at the time of the filing of this patent application to possibly reside broadly in a transfer station wherein the rotation elements 14 are realized in the form of slender roller bodies.

Still another feature or aspect of an embodiment is believed at the time of the filing of this patent application to possibly reside broadly in a transfer station wherein the rotation elements 14 consist of roller bodies that are mounted so that they can rotate on a vertical shaft in alternating directions of rotation depending on the back-up pressure that occurs.

A further feature or aspect of an embodiment is believed at the time of the filing of this patent application to possibly reside broadly in a transfer station wherein the external surface of the rotation elements 14 is adapted to the external contour of the containers/bottles 4 to be inserted into the stream of bottles or runs parallel to their surface.

Another feature or aspect of an embodiment is believed at the time of the filing of this patent application to possibly reside broadly in a transfer station wherein the rotation elements 14 have a noise-reducing surface at least in the area of contact with the containers 4.

Yet another feature or aspect of an embodiment is believed at the time of the filing of this patent application to possibly reside broadly in a transfer station wherein the rotation elements 14 are mounted so that they can be driven in rotation.

Still another feature or aspect of an embodiment is believed at the time of the filing of this patent application to possibly reside broadly in a transfer station wherein the rotation elements 14 can be driven in different directions of rotation.

A further feature or aspect of an embodiment is believed at the time of the filing of this patent application to possibly reside broadly in a transfer station wherein the shafts of the rotation elements 14 can be driven by drive devices 16 that are located underneath the container transport plane.

Another feature or aspect of an embodiment is believed at the time of the filing of this patent application to possibly reside broadly in a transfer station wherein the rotation elements 14 can be rotated by means of a rack-and-pinion drive 17.

Yet another feature or aspect of an embodiment is believed at the time of the filing of this patent application to possibly reside broadly in a transfer station wherein the rotation elements 14 can be driven in different directions of rotation by means of a rack-and-pinion drive 17.

Still another feature or aspect of an embodiment is believed at the time of the filing of this patent application to possibly reside broadly in a transfer station wherein a plurality of rotation elements 14 that are located next to and at some distance from one another can be driven by a common drive.

A further feature or aspect of an embodiment is believed at the time of the filing of this patent application to possibly reside broadly in a transfer station wherein the rotation elements 14 are combined with the associated drive in a component 18.

One feature or aspect of an embodiment is believed at the time of the filing of this patent application to possibly reside broadly in a method for feeding containers into receptacle cells of container cleaning machines with a transfer station, wherein the containers 4 can be moved from their positions outside the infeed paths 15 formed by intermediate webs 12 by means of guidance and steering elements that are in contact against at least part of their external surfaces into the infeed position in the stream of bottles.

Another feature or aspect of an embodiment is believed at the time of the filing of this patent application to possibly reside broadly in a method for feeding containers into receptacle cells of container cleaning machines with a transfer station, wherein the containers 4 can be placed in rotation in the vicinity of or upstream of the actual feed paths 15 to direct the containers 4 into the feed paths.

Yet another feature or aspect of an embodiment is believed at the time of the filing of this patent application to possibly reside broadly in a method for feeding containers into receptacle cells of container cleaning machines with a transfer station, wherein the containers 4 can be introduced into the feed paths as they are rolling around their vertical axis.

Still another feature or aspect of an embodiment is believed at the time of the filing of this patent application to possibly reside broadly in a method for feeding containers into receptacle cells of container cleaning machines with a transfer station, wherein the containers 4 are forcibly guided immediately upstream of the stationary intermediate webs 12.

The invention relates to a method for the operation of a transfer station on container handling machines and similar machines with a wide infeed field consisting of a plurality of transport paths that are located next to one another for feeding containers into the receiving devices of the handling machine and a conveyor that runs at a right angle or at an angle to the actual transfer direction and is used for the feed and discharge of the containers to be handled, with a transition area to the transport paths of the infeed or discharge area and intermediate webs that separate these transport paths. The invention is characterized by the fact that upstream in the infeed direction of the end surfaces 13 of the intermediate webs 12, there are vertically oriented directing elements 14 that can be placed in contact with the bodies of the containers and can steer or guide the containers.

One feature or aspect of an embodiment is believed at the time of the filing of this patent application to possibly reside broadly in a beverage bottling plant for filling beverage bottles with liquid beverage material, said beverage bottling plant comprising: a beverage bottle filling machine being configured and disposed to fill beverage bottles with liquid beverage material; said beverage bottle filling machine comprising: a rotor; a rotatable vertical machine column; said rotor being connected to said vertical machine column to permit rotation of said rotor about said vertical machine column; a plurality of beverage bottle filling elements for filling beverage bottles with liquid beverage material being disposed on the periphery of said rotor; each of said plurality of beverage bottle filling elements comprising a container carrier being configured and disposed to receive and hold beverage bottles to be filled; each of said plurality of beverage bottle filling elements being configured and disposed to dispense liquid beverage material into beverage bottles to be filled; at least one liquid reservoir being configured to hold a supply of liquid beverage material; at least one supply line being configured and disposed to connect said at least one liquid reservoir to said beverage bottle filling machine to supply liquid beverage material to said beverage bottle filling machine; a first star wheel structure being configured and disposed to move beverage bottles into said beverage bottle filling machine; a second star wheel structure being configured and disposed to move beverage bottles out of said beverage bottle filling machine; a beverage bottle closing machine being configured and disposed to close tops of filled beverage bottles; a first conveyor arrangement being configured and disposed to convey filled beverage bottles from said beverage bottle filling machine to said beverage bottle closing machine; said beverage bottle closing machine comprising: a rotor; a rotatable vertical machine column; said rotor being connected to said vertical machine column to permit rotation of said rotor about said vertical machine column; a plurality of closing devices being disposed on the periphery of said rotor; each of said plurality of closing devices being configured and disposed to place closures on filled beverage bottles; each of said plurality of closing devices comprising a container carrier being configured and disposed to receive and hold filled beverage bottles; a first star wheel structure being configured and disposed to move filled beverage bottles into said beverage bottle closing machine; a second star wheel structure being configured and disposed to move filled, closed beverage bottles out of said beverage bottle closing machine; a beverage bottle cleaning machine being configured and disposed to clean empty bottles to be filled; a second conveyor arrangement being configured and disposed to convey cleaned beverage bottles to be filled to said beverage bottle filling machine; a supply conveyor belt being configured and disposed to move empty beverage bottles to be cleaned from a supply of beverage bottles to said beverage bottle cleaning machine; and said beverage bottle cleaning machine comprising: a plurality of beverage bottle receptacles being configured and disposed to receive and hold beverage bottles; a drive arrangement being configured and disposed to move said beverage bottle receptacles through said beverage bottle cleaning machine; at least one bottle cleaning arrangement being configured and disposed to clean beverage bottles being moved through said beverage bottle cleaning machine with a cleaning medium; an infeed arrangement being configured and disposed to receive beverage bottles from said supply conveyor belt and move the beverage bottles into said beverage bottle receptacles; and said infeed arrangement comprising: a plurality of conveyor belts disposed next to one another; said conveyor belts being configured and disposed to run in a direction substantially perpendicular or transverse to a direction in which said supply conveyor belt is configured and disposed to run; a plurality of guide webs, each of which being disposed to project vertically between pairs of adjacent conveyor belts; each of said guide webs having a first end and a second end opposite said first end, wherein said first end is disposed adjacent said supply conveyor belt and said second end is disposed downstream of said first end and adjacent said beverage bottle receptacles; said conveyor belts and said guide webs together define a plurality of beverage bottle transport paths; a plurality of slender guide rollers, each of which being disposed to project vertically adjacent said first end of a corresponding guide web; and said guide rollers being configured and disposed to contact beverage bottles being moved into said infeed arrangement to steer or guide said beverage bottles into said beverage bottle transport paths, and being configured to minimize backing up of beverage bottles being moved and to minimize rattling noise produced by beverage bottles striking against one another upon movement thereof.

A beverage bottling plant for filling beverage bottles with liquid beverage material, said beverage bottling plant comprising: a rotary beverage bottle filling machine being configured and disposed to fill beverage bottles with liquid beverage material; a rotary beverage bottle closing machine being configured and disposed to close tops of filled beverage bottles; a first conveyor arrangement being configured and disposed to convey filled beverage bottles from said beverage bottle filling machine to said beverage bottle closing machine; a beverage bottle cleaning machine being configured and disposed to clean empty bottles to be filled; a second conveyor arrangement being configured and disposed to convey cleaned beverage bottles to be filled to said beverage bottle filling machine; a supply conveyor being configured and disposed to move empty beverage bottles to be cleaned from a supply of beverage bottles to said beverage bottle cleaning machine; and said beverage bottle cleaning machine comprising: a plurality of beverage bottle receptacles being configured and disposed to receive and hold beverage bottles; a drive arrangement being configured and disposed to move said beverage bottle receptacles through said beverage bottle cleaning machine; at least one bottle cleaning arrangement being configured and disposed to clean beverage bottles being moved through said beverage bottle cleaning machine with a cleaning medium; an infeed arrangement being configured and disposed to receive beverage bottles from said supply conveyor and move the beverage bottles into said beverage bottle receptacles; and said infeed arrangement comprising: a plurality of conveyors disposed next to one another; a plurality of guide webs, each of which being disposed to project vertically between pairs of adjacent conveyors; each of said guide webs having a first end and a second end opposite said first end, wherein said first end is disposed adjacent said supply conveyor and said second end is disposed downstream of said first end and adjacent said beverage bottle receptacles; said conveyors and said guide webs together define a plurality of beverage bottle transport paths; a plurality of directing elements, each of which being disposed to project vertically adjacent said first end of a corresponding guide web; and said directing elements being configured and disposed to contact beverage bottles being moved into said infeed arrangement to steer or guide said beverage bottles into said beverage bottle transport paths.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of bottling and container handling systems and components thereof which may possibly be utilized or adapted for use in at least one possible embodiment, may possibly be found in the following U.S. Pat. No. 6,484,477, entitled "Capping Machine for Capping and Closing Containers, and a Method for Closing Containers;" U.S. Pat. No. 6,474,368, entitled "Beverage Container Filling Machine, and Method for Filling Containers with a Liquid Filling Material in a Beverage Container Filling Machine;" U.S. Pat. No. 6,494,238, entitled "A Plant for Filling Beverage into Beverage Bottles Other Beverage Containers Having Apparatus for Replacing Remaining Air Volume in Filled Beverage Bottles or Other Beverage Containers;" U.S. Pat. No. 6,470,922, entitled "Apparatus for the Recovery of an Inert Gas;" U.S. Pat. No. 6,463,964, entitled "Method of Operating a Plant for Filling Bottles, Cans or the like Beverage Containers with a Beverage, and a Beverage Container Filling Machine;" U.S. Pat. No. 6,834,473, entitled "Bottling Plant and Method of Operating a Bottling Plant and a Bottling Plant with Sections for Stabilizing the Bottled Product;" U.S. Pat. No. 6,484,762, entitled "A Filling System with Post-dripping Prevention;" and U.S. Pat. No. 6,668,877, entitled "Filling System for Still Beverages."

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

Some examples of bottling and container handling systems and components thereof which may possibly be utilized or adapted for use in at least one possible embodiment, may possibly be found in the following U.S. patent applications: Ser. No. 10/653617, filed on Sep. 2, 2003, entitled "Labeling Machine with a Sleeve Mechanism for Preparing and Applying Cylindrical Labels onto Beverage Bottles and Other Beverage Containers in a Beverage Container Filling Plant;" Ser. No. 10/666931, filed on Sep. 18, 2003, entitled "Beverage Bottling Plant for Filling Bottles with a Liquid Beverage Filling Material and a Labelling Station for Filled Bottles and Other Containers;" Ser. No. 10/723451, filed on Nov. 26, 2003, entitled "Beverage Bottling Plant for Filling Beverage Bottles or Other Beverage Containers with a Liquid Beverage Filling Material and Arrangement for Dividing and Separating of a Stream of Beverage Bottles or Other Beverage Containers;" Ser. No. 10/739895, filed on Dec. 18, 2003, entitled "Method of Operating a Beverage Container Filling Plant with a Labeling Machine for Labeling Beverage Containers Such as Bottles and Cans, and a Beverage Container Filling Plant with a Labeling Machine for Labeling Beverage Containers Such as Bottles and Cans;" Ser. No. 10/756171, filed on Jan. 13, 2004, entitled "A Beverage Bottling Plant for Filling Bottles and like Containers with a Liquid Beverage Filling Material and a Conveyor Arrangement for Aligning and Distributing Packages Containing Filled Bottles and like Containers;" Ser. No. 10/780280, entitled "A Beverage Bottling Plant for Filling Bottles with a Liquid Beverage Filling Material, a Container Filling Plant Container Information Adding Station, Such As, a Labeling Station, Configured to Add Information to Containers, Such As, Bottles and Cans, and Modules for Labeling Stations;" Ser. No. 10/786256, entitled "A Beverage Bottling Plant for Filling Bottles with a Liquid Beverage Filling Material, and a Container Filling Lifting Device for Pressing Containers to Container Filling Machines;" Ser. No. 10/793659, entitled "A Beverage Bottling Plant for Filling Bottles with a Liquid Beverage Filling Material, and a Container Filling Plant Container Information Adding Station, Such As, a Labeling Station Having a Sleeve Label Cutting Arrangement, Configured to Add Information to Containers, Such As, Bottles and Cans;" Ser. No. 10/801924, filed on Mar. 16, 2004, entitled "Beverage Bottling Plant for Filling Bottles with a Liquid Beverage Filling Material, and a Cleaning Device for Cleaning Bottles in a Beverage Bottling Plant;" Ser. No. 10/813651, filed on Mar. 30, 2004, entitled "A Beverage Bottling Plant for Filling Bottles with a Liquid Beverage Filling Material, and an Easily Cleaned Lifting Device in a Beverage Bottling Plant;" Ser. No. 10/814624, filed on Mar. 31, 2004, entitled "A Beverage Bottling Plant for Filling Bottles with a Liquid Beverage Filling Material, and a Container Filling Plant Container Information Adding Station, Such As, a Labeling Station Having a Gripper Arrangement, Configured to Add Information to Containers, Such As, Bottles and Cans;" Ser. No. 10/816787, filed on Apr. 2, 2004, entitled "A Beverage Bottling Plant for Filling Bottles with a Liquid Beverage Filling Material, and Apparatus for Attaching Carrying Grips to Containers with Filled Bottles;" Ser. No. 10/865240, filed on Jun. 10, 2004, Entitled "A Beverage Bottling Plant for Filling Bottles with a Liquid Beverage Filling Material, a Beverage Container Filling Machine, and a Beverage Container Closing Machine;" Ser. No. 10/883591, filed on Jul. 1, 2004, entitled "A Beverage Bottling Plant for Filling Bottles with a Liquid Beverage Filling Material Having a Container Filling Plant Container Information Adding Station, Such As, a Labeling Station, Configured to Add Information to Containers, Such As, Bottles and Cans, and Modules for Labeling Stations and a Bottling Plant Having a Mobile Module Carrier;" Ser. No. 10/930678, filed on Aug. 31, 2004, entitled "A Beverage Bottling Plant for Filling Bottles with a Liquid Beverage Filling Material, a Container Filling Plant Container Filling Machine, and a Filter Apparatus for Filtering a Liquid Beverage;" Ser. No. 10/931817, filed on Sep. 1, 2004, entitled "A Beverage Bottling Plant for Filling Bottles with a Liquid Beverage Filling Material, Having an Apparatus for Exchanging Operating Units Disposed at Rotating Container Handling Machines;" Ser No. 10/939170, filed on Sep. 10, 2004, Ser. No. 10/954012, filed on Sep. 29, 2004, Ser. No. 10/952706, Ser. No. 10/962183, filed on Oct. 8, 2004, Ser. No. 10/967016, filed on Oct. 15, 2004, Ser. No. 10/982706, filed on Nov. 5, 2004, Ser. No. 10/982694, Ser. No. 10/982710, Ser. No. 10/984677, filed on Nov. 9, 2004, Ser. No. 10/985640, filed on Nov. 10, 2004, Ser. No. 11/004663, filed on Dec. 3, 2004, Ser. No. 11/009551, filed on Dec. 10, 2004, Ser. No. 11/012859, filed on Dec. 15, 2004, Ser. No. 11/014673, filed on Dec. 16, 2004, Ser. No. 11/016364, filed on Dec. 17, 2004, and Ser. No. 11/016363, The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the prosecution of the corresponding German application, and/or cited elsewhere are hereby incorporated by reference as if set forth in their entirety herein as follows: U.S. Pat. No. 2,183,433 and DE 1 105 298.

The corresponding foreign and international patent publication applications, namely, Federal Republic of Germany Patent Application No. 10 2005 0 43 437, filed on Sep. 13, 2005, having inventors Ulrich WIEDEMANN and Klaus JENDRICHOWSKI, and DE-OS 10 2005 0 43 437 and DE-PS 10 2005 0 43 437, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A transfer station in a container filling plant, said transfer station comprising:
    an input and an output;
    an upstream infeed area, disposed by said input, configured to receive containers and a downstream discharge area, disposed by said output, configured to discharge containers;
    at least one conveyor belt disposed to feed containers entering into said transfer station from said upstream infeed area and being configured to feed containers into receiving devices of a container handling machine;
    a plurality of webs disposed, with respect to one another, to form spaces between said webs, which spaces are disposed to receive lines of containers for movement through said transfer station from said upstream infeed area;
    said webs comprising upstream end surfaces disposed towards said input;
    said webs being disposed to separate rows of containers to prevent said containers from contacting containers in another row of containers and thus reducing noise;
    vertically oriented rotatable directing elements having vertical rotational axes and being rotatable about the vertical rotational axes;
    said rotatable directing elements being disposed in the infeed direction upstream of said upstream end surfaces of said webs;
    said vertically oriented rotatable directing elements being configured and disposed to contact the bodies of containers to steer or guide the containers into said receiving spaces between said webs and thus minimizing jams of containers in said infeed area.

2. The transfer station according to claim 1, including rotating apparatus connected to said rotatable directing elements and configured to rotate said rotatable directing elements and, wherein said rotatable directing elements comprise guide rollers being configured and disposed to contact containers being moved into said transfer station to steer or guide said containers into the spaces between said webs, and being configured to minimize backing up of containers being moved.

3. The transfer station according to claim 2, wherein:
    said rotatable directing elements comprising a vertical shaft, connected to said rotating apparatus, and being configured and disposed to rotate in alternating directions of rotation.

4. The transfer station according to claim 3, wherein: each of said rotatable directing elements comprising an external surface being configured to adapt to the external contour of the containers being inserted into the stream of containers and said external surface runs parallel or is configured to conform to the surface of the containers.

5. The transfer station according to claim 4, wherein:
    said rotatable directing elements further comprise a noise-reducing surface material at least in the area of contact with the containers.

6. The transfer station according to claim 5, wherein:
    said rotating apparatus is disposed beneath said at least one conveyor belt.

7. The transfer station according to claim 6, wherein:
    said plurality of rotatable directing elements are disposed adjacent and at a distance from one another.

8. The transfer station according to claim 7, wherein:
    said rotating apparatus, connected to said rotatable directing elements, are configured to rotate said rotatable directing elements, comprising:
    a rack-and-pinion drive being configured to rotate said plurality of rotatable directing elements in different directions of rotation.

9. The transfer station according to claim 8, wherein:
    said directing elements are configured and disposed to contact at least part of the external surfaces of the containers;
    said spaces formed by said webs comprising infeed paths; and
    said directing elements being configured and disposed to guide and steer the containers from their positions outside the infeed paths formed by said webs into the infeed position in the stream of containers.

10. The transfer station according to claim 9, wherein:
    said rotatable directing elements being configured and disposed to forcibly guide the containers upstream of said upstream ends of said webs.

11. The transfer station according to claim 10, wherein:
    said rotatable directing elements further comprising roller bodies.

12. A transfer station in a bottling plant, said transfer station comprising:
    an input and an output;
    a supply conveyor belt disposed adjacent said input;
    an upstream infeed area, disposed by said input, configured to receive bottles from said supply conveyor belt and a downstream discharge area, disposed by said output, configured to discharge bottles;
    at least one conveyor belt disposed to feed bottles entering into said transfer station from said upstream infeed area and being configured to feed bottles into receiving devices of a bottle handling and receiving section of a bottle cleaning machine;
    a plurality of webs disposed, with respect to one another, to form spaces between said webs, which spaces are disposed to receive lines of bottles for movement through said transfer station from said upstream infeed area;

said supply conveyor belt having a direction of travel, to move bottles, being perpendicular to the direction of movement of bottles through said transfer station;

said webs comprising upstream end surfaces disposed towards said input;

said webs being disposed to separate rows of bottles to prevent said bottles from contacting bottles in another row of bottles and thus reducing noise;

a plurality of rotatable transfer mechanisms having axes of rotation that run perpendicular to the direction of movement of bottles through said transfer station;

said rotatable transfer mechanism being configured to rotate bottles, received from said at least one conveyor belt through said spaces between said webs, by an angle of about 90° and thus to reposition upright bottles with their openings in an upright, uppermost, position to a position where the openings of the bottles are in a lying down position, facing the direction of downstream travel;

vertically oriented rotatable round cylindrical directing elements having vertical rotational axes and being rotatable about their vertical rotational axes;

rotating apparatus connected to said rotatable round cylindrical directing elements to rotate said rotatable round cylindrical directing elements;

said rotatable round cylindrical directing elements being disposed in the infeed direction upstream of said upstream end surfaces of said webs;

said vertically oriented rotatable round cylindrical directing elements being configured and disposed to contact the bodies of bottles, with the rotation being configured to steer or guide the bottles into said receiving spaces between said webs and thus minimizing jams of bottles in said infeed area.

13. The transfer station according to claim 12, wherein:

said rotatable directing elements comprising a vertical shaft, connected to said rotating apparatus, and configured and disposed to rotate in alternating directions of rotation.

14. The transfer station according to claim 13, wherein:

each of said rotatable directing elements comprising an external surface being configured to adapt to the external contour of the bottles being inserted into the stream of bottles and said external surface runs parallel or configures to the surface of the bottles.

15. The transfer station according to claim 14, wherein:

said rotatable directing elements further comprising a noise-reducing surface material at least in the area of contact with the bottles.

16. The transfer station according to claim 15, wherein:

said rotating apparatus is disposed beneath said at least one conveyor belt;

said plurality of rotatable directing elements are disposed adjacent and at a distance from one another;

said rotating apparatus connected to said rotatable directing elements and configured to rotate said rotatable directing elements comprising:

a rack-and-pinion drive being configured to rotate said plurality of rotatable directing elements in different directions of rotation;

said rotatable directing elements being configured and disposed to contact at least part of the external surfaces of the bottles;

said spaces formed by said webs comprising infeed paths;

said rotatable directing elements being configured and disposed to guide and steer the bottles from their positions outside the infeed paths formed by said webs into the infeed position in the stream of bottles; and said rotatable directing elements being configured and disposed to forcibly guide the bottles immediately upstream of the stationary intermediate webs.

17. The transfer station according to claim 16, wherein:

said rotatable directing elements comprising roller bodies.

\* \* \* \* \*